April 24, 1934.  A. ST. ONGE  1,956,162
BEATER FOR COTTON PICKERS
Filed July 21, 1931

Inventor:
Amasa St. Onge
By Pennington and White
Attorneys.

Patented Apr. 24, 1934

1,956,162

UNITED STATES PATENT OFFICE 1,956,162

BEATER FOR COTTON PICKERS

Amasa St. Onge, Providence, R. I.

Application July 21, 1931, Serial No. 552,091

7 Claims. (Cl. 19—94)

This invention relates to an apparatus for and a method of treating fibrous material and more particularly to an apparatus for and a method of opening and cleaning cotton in the picker.

One object of the invention is to provide in an apparatus for picking and opening cotton, a serrated member for treating the cotton and means for simultaneously directing a current of air through the fibers to expel dust and foreign particles therefrom.

Another object of the invention is to provide an improved method of treating fibrous material by initially opening up the fibers to render them more accessible for cleaning.

Another object of the invention is to provide a method of and apparatus for extracting foreign matter from cotton or similar materials without injuring the fibers thereof.

Another object of the invention is to provide in an apparatus for cleaning cotton, a rotating spider having a plurality of working elements so positioned as to individually and cooperatively treat the cotton to clean it with maximum efficiency and a minimum of deleterious effect thereon.

Another object of the invention is to provide in a cotton picker, a pin beater wherein the combing elements are banked for maximum combing effect and arranged for individual demounting and replacement.

Further objects of the invention are set forth in the following specification which describes a preferred form of construction of the invention, by way of example, as illustrated by the accompanying drawing. In the drawing.

Figure 1:
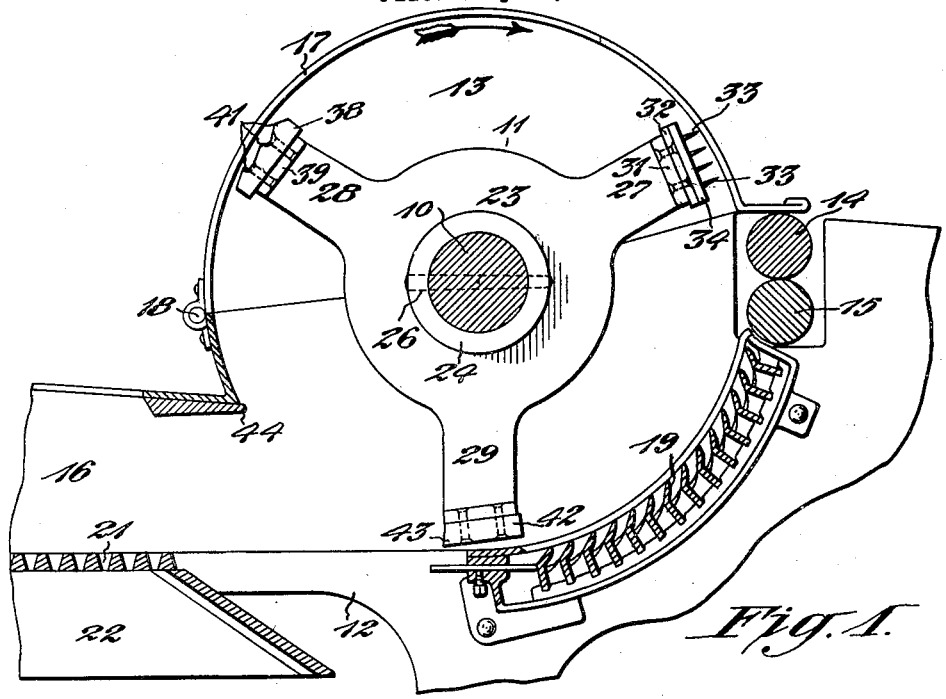
Fig. 1 is a vertical sectional view of the main elements of a cotton picker constituting one embodiment of the invention.
Figure 2:
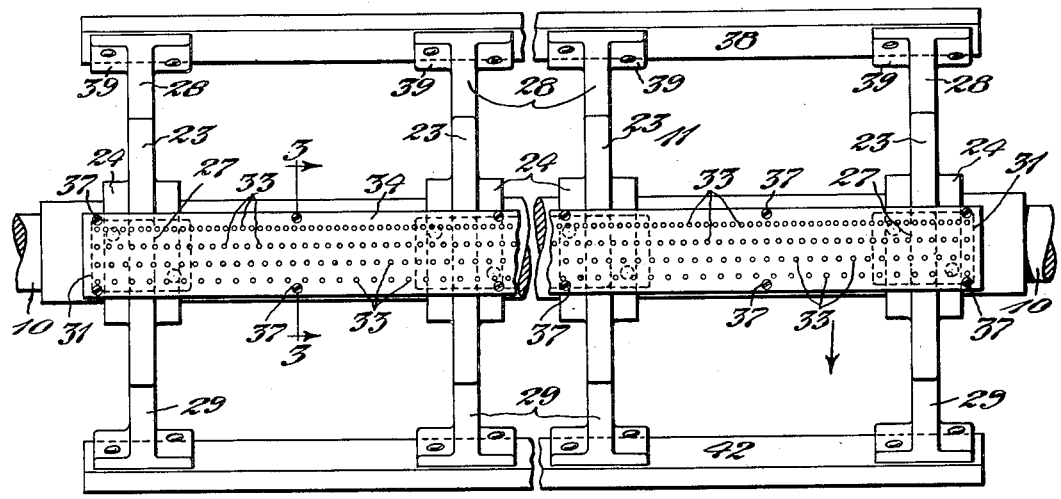
Fig. 2 is a front elevation of the beater and picker element of the apparatus showing the arrangement of the beater pins.

Referring to the drawing, wherein like parts are indicated by the same reference numerals, a cotton picker constituting one embodiment of the invention comprises the novel form and arrangement of the elements as next described. A horizontal shaft 10 to which a beater 11 is fixed is journaled in a picker frame 12 and adapted to be driven in a clockwise direction, as viewed in Fig. 1, from any suitable source of power, not shown. The picker frame 12 is provided with opposite side members, only one of which is shown in the drawing, which constitute a chamber 13 for receiving the cotton or other material to be cleaned. The cotton is fed into one end of the chamber 13 by means of a pair of opposite alined feed-rolls 14 and 15 which are preferably driven at a constant rate of speed in the usual manner. The feed-rolls 14 and 15 rotate in opposite directions and cooperate to advance the cotton therebetween into the beater.

At the opposite end of the chamber 13 is a passage 16 through which the opened and cleaned cotton is discharged from the picker. The picker is provided with a hood or cover 17 hinged to the frame 12 at 18 to adapt it to be opened to give access to the interior of the chamber 13. A segmental grid 19 is fixed to the frame 12 below the rolls 14 and 15 to serve for removing the heavier dirt and foreign particles cleaned from the cotton; while a second grid 21 positioned above a refuse box 22 is disposed in the bottom of the passage 16 for collecting foreign particles not removed by way of the grid 19. As is customary in apparatus of the present type, suitable means, not herein shown, are provided for creating a forced draft upwardly through the grid 19 and outwardly by way of the passage 16 in sufficient volume to discharge the cleaned cotton from the picker. The air current, however, is not sufficient to influence the movement of the foreign particles, motes and dirt which are removed through the grid 19. The parts of the apparatus described above are well known and may be of conventional type.

One feature of the improvement in the present invention consists in the beater element 11 which may comprise any desired number of spiders 23 spaced across the width of the beater and each provided with an axially apertured hub secured on the shaft 10. Each spider 23 comprises a plurality of arms or spokes 27, 28 and 29 projecting radially from its hub 24. The spiders 23 are rigidly secured to the drive-shaft 10 by suitable means such, for example, as the tapered pins 26 extending through their hubs 24. As will be observed by reference to Fig. 1, the arms 27, 28 and 29 are of substantially the same length and the several spiders 23 are fixed in position with their arms in alinement along the shaft 10. The arms 27, 28 and 29 carry picker or beater members as next described in detail and referred to in the order in which they operate on the cotton in a single cleaning cycle.

Figure 3:
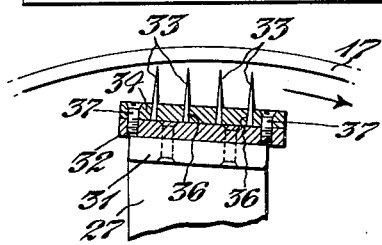
Fig. 3 is a partial sectional view of the same, taken on line 3—3 of Fig. 2, and showing the manner of mounting the pins in the beater.

The arms 27 are formed at their outer ends with flanges 31, see Fig. 3, which are inclined at a slight angle to the radial direction, the foremost edge, with respect to the direction of the rotation of the spider, being nearer to the axis of the drive-shaft 10 than the rearward edge. The purpose of this form of construction is as next explained. A flat plate 32 is riveted or otherwise permanently secured to the outer faces of the flanges 31, thereby constituting an inclined base or support for any desired number of pointed combing pins 33. The pins 33 are held in place by a second plate 34 which is formed with tapered apertures 36 through which the tapered pins 33 are driven. The plate 34 is superposed on the plate 32 and detachably secured thereto by screws 37 having their heads counter-sunk in the outer face of the plate 34. The tapered pins are thus rigidly secured in place extending in rows along the plate 34 and pointing radially outward therefrom in appropriate position to act as a comb. Should one or more of the pins 33 become bent or broken, as, for instance, by striking a piece of bail wire or other hard object in the cotton, the damaged pin or pins may be quickly and easily replaced by merely detaching the plate or bar 34. The plate 34 is detached from the plate 32 by removing the screws 37 and the stumps of the broken pins may then be driven out or otherwise withdrawn from the apertures 36 and replaced by new pins.

The pins 33 are arranged on the plate 34 in parallel rows which extend from end to end of the plate with different spacing in the different rows. In the preferred arrangement herein illustrated there are four rows, the first row, as to the order of engagement with the cotton, having the pins spaced farthest apart, the next row slightly closer, and so on, with the pins in the last row quite close. The inclination of the plate-supporting flanges 31 on the spiders 23 is for the purpose of disposing the rearward edge of the plate 34 in closer relationship to the segmental grid 19 than the front edge thereof. As the pins 33 are preferably of uniform length, those on the forward edge of the plate 34 project into the path of the cotton only far enough to comb the surface of the mass, the second row projects farther to comb deeper, the third projects still farther, and the last row may project to within a very short distance of the grid 19 to comb clear through the cotton. In accordance with this improved arrangement, the pins have a progressively increasing penetration into the material to effectually break up the mass and straighten the fibers, while also tending to lessen the strain on the pins as they enter the material. Moreover, the graduated spacing of the pins in the successive rows has the same effect of progressively increasing the combing action and distributing the strain to prevent breaking or bending the pins. As a substitute for the inclined arrangement of the pin plate 34 the pins may be of graduated length in different rows whereby to obtain the same progressively increasing combing effect. The arrangement and disposition of the pins as illustrated in the drawing and described above is preferred, however, as it permits the use of pins of uniform length capable of being used interchangeably in the apertures in the plate 34.

The arms 28 of the spiders 23 are connected at their extremities by a blade or bar 38 extending across the beater and riveted to the flanges 39 or secured in place by any other suitable means. The bars 38 are serrated on their outer faces to effect a rubbing or scrubbing action on the cotton to loosen the dirt particles therein, the bars preferably having three tooth-like ridges 41 extending throughout their length continuously from one end to the other thereof. The ridges 41 may be of the same or different depths, and the forward ridge is preferably formed with a generally sloping front face which presses the cotton down as it passes thereover. As herein illustrated, the forward faces of the two remaining ridges are steeper, in fact practically perpendicular to the plane of the cotton whereby they act to pick up the fibers while the recesses between the teeth create suction eddies or currents of air. These air currents are directed through the cotton as the blades pass thereover, thereby billowing and fluffing it out to assist in the separation of the dirt and foreign particles therefrom. The blade 38 is inclined to the radial direction with its forward edge closer to the axis of the beater whereby the cotton is subjected to a progressively increasing rubbing and scrubbing action as the beater passes thereover.

As in the case of the comb elements of the pin beater the progressively increased extent of engagement of the teeth of the corrugated beater blade 38 with the material distributes the shock of impact more evenly over the entire surface of the blade. This provision makes for greater durability of the apparatus by relieving the wear and eliminating any tendency of the blades 38 to become loosened. Furthermore, this improved form of construction has the further effect of preventing the cotton or other material from wrapping or coiling around the beater elements, the inclined faces of the blades 38 tending to iron the cotton against the grid 19.

The arms or members 29 of the spiders 23 are connected at their extremities by a flat bar 42 constituting a beater blade of the usual type for striking a blow against the cotton to dislodge motes and other foreign matter therefrom. The plate 42 is set at an angle with its forward edge 43 adapted to strike the blow against the cotton or other material. The cotton is thus caught between its forward edge and the grid 19, and the fibers separated by a pulling action rather than a crushing movement as heretofore administered by similar beater elements. The opened and cleaned portions of cotton are thus continuously removed from the advancing mass without damage to the fibers, and upon being tossed into the outlet passage 16, and over the flat grid 21 the last vestiges of dirt particles are discharged through the grid. A stripping rail 44 is attached to the frame 12 above the outlet passage 16 for preventing portions of the cotton from being carried upwardly by the blade 43 beyond the outlet passage 16.

The manner of operation of the present improved apparatus and its novel method of treating the fibrous material is as next explained. As is well known in the art of opening and scutching cotton, the rolls 14 and 15 feed the cotton mass to be treated slowly into the chamber 13. The mass moves in an arcuate course as defined by the grid 19 leading downwardly in the direction of the outlet passage 16. The purpose of treating the cotton in the picker is to remove motes, dirt and foreign particles therefrom and to comb and arrange the fibers in parallelism to prepare the cotton for carding and spinning. Heretofore cotton pickers have had only one or two types of cleaning members, one a pin beater for combing the fibers and the other a beater to dislodge foreign particles. The beater usually functioned not only to beat the dirt out, but also to remove from the mass cleaned portions of the cotton and to toss them into the outlet passage or carry them against the stripping rail. The pin beater and the beater blade were usually rotated in unison, being mounted on the same driving shaft and spaced apart to cause the one to engage the material at regular intervals of time after the other.

The drive-shaft of the picker is usually rotated at a high speed as compared to the feed-rolls so that in advancing over the grid a particular area of cotton is struck repeatedly, the frequency of the blows depending upon the condition of the mass. If the mass were quite dirty, tightly bunched and matted or contained considerable foreign matter, the speed of the rolls and beater would be varied to permit an increased number of blows upon a certain area of the mass. Although these repeated blows of the beater blade were heretofore deemed necessary to clean the cotton, it was nevertheless also recognized that the fibers were liable to be crushed and injured thereby, and the quality of the staple consequently lowered.

It is primarily an object of the present invention to protect and preserve the quality of the cotton and to this end the additional serrated or corrugated beater blade 38 is provided in the present improved apparatus. When the drive-shaft 10 is rotated the beater 38 acts on the cotton immediately following the action of the pin beater 27, and its function is two-fold. The ridges 41 on the blade 38 rub against the cotton and apply a scrubbing action thereto and at the same time currents and eddies of air are developed in the depressions between the ridges due to the rapid rotation of the beater. These air currents are directed into the cotton and by swirling therethrough blow out a good part of the foreign particles while opening up the mass.

Not only does the serrated beater 38 directly assist materially in the cleaning of the cotton by the scrubbing and the blowing action referred to, but it indirectly facilitates, in a very considerable degree, the cleaning action of the beater blade 42 which strikes the mass subsequently thereto. A considerable portion of the foreign matter in the cotton being loosened by the beater 38, fewer blows of the beater blade 42 are required to thoroughly clean a given area of the cotton. This cooperative action is of great advantage as tending to prevent the bruising and crushing of the staple which usually follows as a result of the many blows of the ordinary beater blade. Moreover, the scrubbing and blowing functions of the corrugated or serrated beater 38 are carried on simultaneously with the fibers of the mass air-cushioned during the scrubbing to prevent them from being crushed and broken.

Following the action of the serrated beater 38 the flat beater blade 42 strikes the cotton to loosen and dislodge the dirt and these blows may be less rapid and violent than is the case where only a single flat blade is employed as is the usual practice. That is to say, a relatively light blow of the blade 42 is rendered more efficient because of the peculiar construction of the blade, the forward edge thereof being projected outwardly to adapt it to act with a pulling effect without tending to crush the fibers.

It will be observed from the foregoing explanation that the present improved apparatus is more efficient for the purpose intended while being capable of being used for cleaning various kinds of materials without injury to the fibers thereof.

It is to be understood that my improved apparatus may be applied to use for treating different kinds of fibrous material other than cotton; for example, wool, linen or hemp and therefore the invention is not limited in this respect. It is also to be understood that various modifications may be made in the form and structure of the parts of the apparatus and the steps in the method by which it operates without departing from the spirit or scope of the invention. Therefore, without limiting myself to the exact embodiment herein shown and described, I claim:

1. In a beater for cotton pickers, a pin beater, a corrugated beater having its forward edge closer to the axis of the hub than its rearward edge, and a rigid beater blade having its rearward edge closer to the axis of the hub than its forward edge.

2. In an apparatus for cleaning textile fibers, a pin beater, a corrugated beater, and a beater blade arranged in spaced relationship around a rotatable hub for successive engagement with the fibers in the order named, each beating member being so inclined that one edge thereof is farther from the hub axis than the opposite edge to regulate their effect on the fibers.

3. In an apparatus for treating fibrous materials, a rotatable member having a plurality of rigid elements for engaging the material, the engaging surface of each element being inclined to locate one edge thereof farther from the axis of rotation than the opposite edge, one of said elements having its forward edge located farthest from the axis of rotation, and another of said elements having its rearward edge farthest from said axis.

4. In an apparatus for cleaning fibrous materials, the combination of a rotatable element having a plurality of circumferentially-spaced members for treating the material, one of said members provided with a plurality of sharpened pins, another of said members comprising a relatively flat blade arranged with its forward edge at a greater distance from the axis of rotation than its rearward edge, and another member having a blade formed with longitudinally-extending grooves providing a series of continuous ridges disposed at different distances from the axis of rotation.

5. In an apparatus for treating fibrous materials, a rotatable element carrying a plurality of members adapted to be brought successively into engagement with the material, one of said members having a series of pins projecting radially of its axis of rotation, another member having a relatively flat face disposed with its forward edge at a greater distance from its axis of rotation than its rearward edge, and another member having a plurality of corrugations extending throughout its length in parallel relation to its axis of rotation to provide a series of spaced apart ribs for engaging successively with the material to scrub the latter.

6. In an apparatus for cleaning fibrous material, means for advancing the material, a plurality of members adapted to be brought successively into engagement with the material, one of said members consisting of a pin beater having an apertured plate secured thereto, and pins rigidly held in the plate and so positioned that the pins last engaging the material penetrate deeper thereinto than those first engaging the material and another of said members consisting of a rigidly mounted inclined beater blade having a forward edge projecting into the material farther than its rearward edge in order to beat and separate the fibers without crushing them.

7. In an apparatus for cleaning cotton, means for advancing the cotton in a predetermined path, a pin beater comprising a rotatable member, means for rotating said member in the path of the cotton, a plurality of rows of combing pins on the member arranged in rows and spaced at graduated distances apart, with the pins having the closest spacing adapted to project into the cotton to a greater extent than those having a wider spacing, a corrugated member for scrubbing the cotton after the combing member, and an inclined beater blade for engaging the cotton after the corrugated member for separating portions thereof without crushing the fibers.

AMASA ST. ONGE.